H. A. OLSSON.
BALL RETAINER FOR BALL BEARINGS SUBJECTED TO AXIAL PRESSURE.
APPLICATION FILED AUG. 16, 1911.

1,135,044.

Patented Apr. 13, 1915.

Witnesses:
Otto W. Holmgren
F. George Barry

Inventor:
Henning Adolf Olsson
by his attorneys

UNITED STATES PATENT OFFICE.

HENNING ADOLF OLSSON, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-RETAINER FOR BALL-BEARINGS SUBJECTED TO AXIAL PRESSURE.

1,135,044. Specification of Letters Patent. Patented Apr. 13, 1915.

Application filed August 16, 1911. Serial No. 644,366.

*To all whom it may concern:*

Be it known that I, HENNING ADOLF OLSSON, a subject of the King of Sweden, and resident of Villa Säfvenäs 5, Gottenborg, in the Kingdom of Sweden, have invented certain new and useful Improvements in Ball-Retainers for Ball-Bearings Subjected to Axial Pressure, of which the following is a specification, reference being had therein to the accompanying drawing.

This invention relates to a retainer for the balls of ball-bearings subjected to axial pressure, which can be manufactured at a low price, can easily be used, owing to the fact that the balls can easily be mounted in the same, and besides is reliable and durable. The said retainer consists of a yielding ring of sheet metal, which is ∩-shaped in cross section and the shanks of which are parallel or substantially parallel to the plane of the ring and are located at a distance from each other, which is shorter than the diameter of the ball. The said shanks are provided with circular recesses, the circumference of which is greater than a semicircle but does not form a complete circle, owing to the fact that the center point of the recess is located at a distance from the edge of the shank which is shorter than the radius of the recess. Two recesses of this type, one provided in each of the shanks, are located opposite each other. The ball is introduced into the same by being forced into the space between the yielding shanks.

Figure 1:
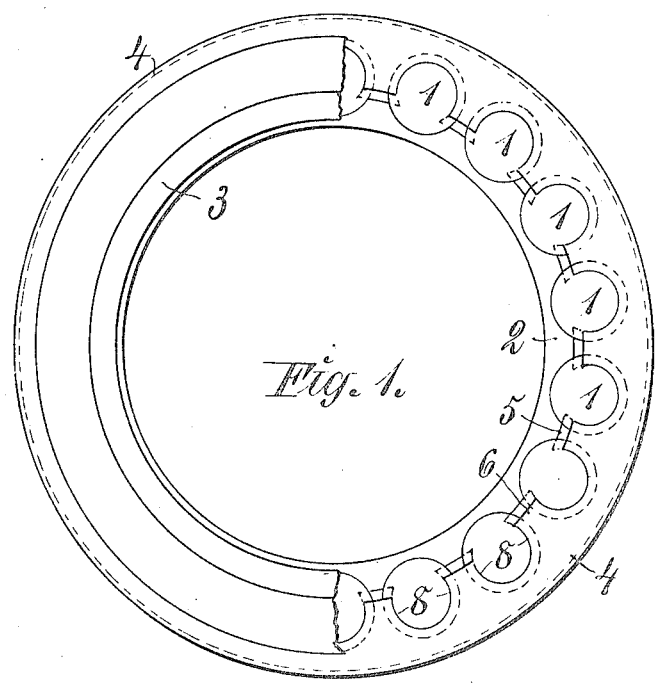
Figure 2:
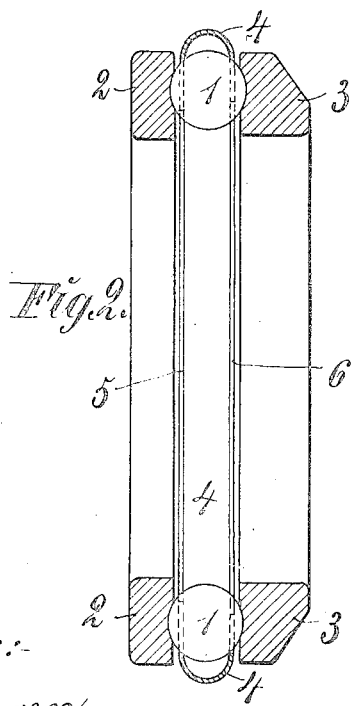

In the accompanying drawing Figure 1 is a side view of the retainer; a part of one of the rings of the bearing is omitted. Fig. 2 is an axial section of the retainer and the rings.

The balls 1 bear against the rings 2, 3, between which they are located, and are kept at proper distances from each other by the retainer 4. The said retainer consists of a stamped ring of sheet metal and ∩-shaped in cross section. The two shanks 5, 6 of the ring extending inward toward the center of the ring are parallel or substantially parallel to the plane of the ring, as shown in Fig. 2. In each of the shanks, at the edge of the same a recess 8 is provided for every ball of the series. The said recess is circular, so that the ball fits in the same, but has a shorter radius than the ball. The distance between the shanks of the ring being besides shorter than the diameter of the ball, the ball is sufficiently inclosed and nevertheless free at both its sides, so that it can rotate, bearing against the rings 2, 3. The yielding capacity of the shanks would possibly be exceeded, as the ball is forced into the space between the same, if the recess 8 forms a complete circle. For that reason the recesses 8 are open inward toward the center of the retainer, the opening comprising, however, not more than one third of a circle or substantially so, consequently a shorter distance than a semicircle. Owing to this arrangement the ball can easily be forced into the recesses and then remains in the same with a sufficient play. In order to facilitate still more the said operation one 5 of the shanks is somewhat wider than the other.

Having now described my invention, what I claim as new and desire to secure by Letters Patent is:

1. A ball retainer for ball bearings subjected to axial pressure, consisting of a yielding ring of sheet metal inverted U-shape in cross section, the said ring being provided with shanks projecting inwardly from its opposite edges substantially parallel with the plane of the ring, the said shanks being located at a distance from each other less than the diameter of the balls and provided with recesses for the balls, the said recesses being smaller than the balls and open at the edges of the shanks to permit the balls to be snapped into the recesses in the shanks by the yielding of the metal.

2. A ball retainer for ball bearings subjected to axial pressure, consisting of a yielding ring of sheet metal inverted U-shape in cross section and provided with shanks projecting inwardly from the opposite edges of the ring substantially parallel with the plane of the ring, the said shanks being provided with recesses open in one of the shanks at the edge of the same, the size of the said recesses and the distance between the shanks being so related to the balls that the latter will be retained in position after having been snapped in place by the yielding of the metal.

3. A ball retainer for ball bearings subjected to axial pressure, consisting of a yielding ring of sheet metal inverted U-shape in cross section, the said ring being provided with shanks projecting therefrom parallel with the plane of the ring and directed inwardly toward the center of the ring, the said shanks being provided with recesses for the balls, the recesses being open at the edges of the shanks, the size of the recesses being less than the size of the balls and the shanks being so spaced with reference to the size of the balls that the latter will be retained in position when snapped in place by the yielding of the metal.

In witness whereof, I have hereunto signed my name in the presence of two subscribing witnesses.

HENNING ADOLF OLSSON.

Witnesses:
 GUST. JEANSONY,
 TVAI LANSSON.